(12) United States Patent
Chen et al.

(10) Patent No.: US 10,241,593 B2
(45) Date of Patent: *Mar. 26, 2019

(54) OPTICAL PROCESSING APPARATUS AND LIGHT SOURCE LUMINANCE ADJUSTMENT METHOD THEREOF

(71) Applicant: PixArt Imaging Inc., Hsin-Chu County (TW)

(72) Inventors: Chun-Wei Chen, Hsin-Chu County (TW); Ching-Lin Chung, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/417,728

(22) Filed: Jan. 27, 2017

(65) Prior Publication Data

US 2017/0139489 A1 May 18, 2017

Related U.S. Application Data

(60) Continuation-in-part of application No. 15/240,120, filed on Aug. 18, 2016, now Pat. No. 9,606,636, (Continued)

(30) Foreign Application Priority Data

Feb. 4, 2013 (TW) .............................. 102104112 A

(51) Int. Cl.
*G06F 3/03* (2006.01)
*G06T 7/00* (2017.01)
(Continued)

(52) U.S. Cl.
CPC .......... *G06F 3/0312* (2013.01); *G04G 21/00* (2013.01); *G06F 1/163* (2013.01); *G06F 1/169* (2013.01);
(Continued)

(58) Field of Classification Search
CPC ...... G06F 3/0312; G06F 3/0362; G06F 1/163; G06F 1/169; G06F 3/0304; G04G 21/00; G04G 21/08; H04N 5/2356
See application file for complete search history.

(56) References Cited

U.S. PATENT DOCUMENTS 9,336,619 B2 * 5/2016 Kim ................... H04N 5/23229
9,578,253 B2 * 2/2017 Chen ................... H04N 5/2353
(Continued)

FOREIGN PATENT DOCUMENTS

| CN | 1936805 A | 3/2007 |
|---|---|---|
| CN | 102693046 A | 9/2012 |
| CN | 102855026 A | 1/2013 |

OTHER PUBLICATIONS

U.S. Final Office Action corresponding to U.S. Appl. No. 13/959,225; dated Apr. 28, 2016.
(Continued)

*Primary Examiner* — Amr A Awad
*Assistant Examiner* — Stephen A Bray
(74) *Attorney, Agent, or Firm* — Hauptman Ham, LLP

(57) ABSTRACT

An optical processing apparatus and a light source luminance adjustment method adapted to detect a rotational displacement and a pressing state are provided. The optical processing apparatus includes a light source unit, a processing unit, and an image sensing unit, wherein the processing unit is electrically connected to the light source unit and the image sensing unit. The light source unit provides a beam of light. The processing unit defines a frame rate, defines a plurality of time instants within a time interval, and sets the light source unit to a luminance value at each of the time instants. A length of the time interval is shorter than the reciprocal of the frame rate. The luminance values are different and are within a range. The image sensing unit captures an image by an exposure time length at each of the time instants, wherein the exposure time lengths are the same.

20 Claims, 10 Drawing Sheets

Related U.S. Application Data which is a division of application No. 13/959,225, filed on Aug. 5, 2013, now Pat. No. 9,578,253.

(51) Int. Cl.
*G06F 3/0362* (2013.01)
*H04N 5/235* (2006.01)
*G04G 21/00* (2010.01)
*G06F 1/16* (2006.01)

(52) U.S. Cl.
CPC .......... *G06F 3/0304* (2013.01); *G06F 3/0362* (2013.01); *G06T 7/0002* (2013.01); *H04N 5/2351* (2013.01); *H04N 5/2353* (2013.01); *H04N 5/2354* (2013.01); *H04N 5/2356* (2013.01); *G06T 2207/10144* (2013.01); *G06T 2207/30168* (2013.01)

(56) References Cited

U.S. PATENT DOCUMENTS

| | | | | |
|---|---|---|---|---|
| 9,606,636 | B2* | 3/2017 | Chen | G06F 3/0308 |
| 2006/0255152 | A1 | 11/2006 | Xie et al. | |
| 2006/0267945 | A1* | 11/2006 | Huang | G06F 3/0317 |
| | | | | 345/166 |
| 2008/0062149 | A1* | 3/2008 | Baruk | G06F 3/0421 |
| | | | | 345/175 |
| 2009/0195505 | A1 | 8/2009 | Chen et al. | |
| 2010/0078303 | A1* | 4/2010 | Larsen | H01H 13/705 |
| | | | | 200/5 A |
| 2010/0195935 | A1* | 8/2010 | Brosnan | G06F 3/0317 |
| | | | | 382/321 |
| 2011/0037725 | A1* | 2/2011 | Pryor | G01C 21/3664 |
| | | | | 345/174 |
| 2011/0240836 | A1* | 10/2011 | Phan Le | G01D 5/285 |
| | | | | 250/231.11 |
| 2012/0127128 | A1* | 5/2012 | Large | G06F 3/0425 |
| | | | | 345/175 |
| 2012/0274606 | A1* | 11/2012 | Song | G06F 3/042 |
| | | | | 345/175 |
| 2017/0089736 | A1* | 3/2017 | Rai | G01D 5/3473 |

OTHER PUBLICATIONS

U.S. Non Final Office Action corresponding to U.S. Appl. No. 13/959,225; dated Sep. 18, 2015.

U.S. Notice of Allowance corresponding to U.S. Appl. No. 15/240,120; dated Nov. 14, 2016.

* cited by examiner

OPTICAL PROCESSING APPARATUS AND LIGHT SOURCE LUMINANCE ADJUSTMENT METHOD THEREOF

CROSS-REFERENCES TO RELATED APPLICATIONS

This application a continuation-in-part application of U.S. patent application Ser. No. 15/240,120 filed on, Aug. 18, 2016, and the entire contents of which are incorporated herein by reference. The Ser. No. 15/240,120 application is a divisional application of U.S. patent application Ser. No. 13/959,225, filed on Aug. 5, 2013, and the entire contents of which are incorporated herein by reference. The Ser. No. 13/959,225 application claimed the benefit of the date of the earlier filed Taiwan Patent Application No. 102104112 filed on Feb. 4, 2013, priority to which is also claimed herein, and the contents of which are also incorporated by reference herein.

BACKGROUND OF THE INVENTION

Field of the Invention

The present invention relates to an optical processing apparatus, a light source luminance adjustment method, and a non-transitory computer readable medium thereof. More particularly, the present invention relates to an optical processing apparatus, a light source luminance adjustment method, and a non-transitory computer readable medium thereof that can adjust the luminance settings of a light source according to the image quality.

Descriptions of the Related Art

With the development of science and technologies, optical touch control technologies have gradually found application in various fields. Accordingly, various kinds of optical processing apparatuses such as optical navigation apparatuses, optical touch panels, and the like, have been developed.

In conventional optical processing apparatuses, a light source unit is used to project a beam of light onto a reflective surface. An image is captured by an image sensing unit so that a processing unit can execute subsequent operations according to the captured image. For example, if the optical processing apparatus is an optical navigation apparatus, a processing unit thereof compares the images that are consecutively captured to determine the amount of displacement of the optical navigation apparatus within a time interval. Then, a cursor displayed on the screen is controlled according to the amount of displacement for navigation purposes. As can be seen from this, the result of the processing unit is determined by the quality of the images captured by the image sensing unit. For example, for some optical processing apparatuses, images that are too bright or too dark will have an adverse effect on the result of the subsequent determination and be considered to have poor quality.

One conventional optical processing apparatuses has improved the aforesaid problem by adjusting the exposure time length used to capture images. Specifically, the exposure time length used to capture the subsequent image will be reduced when the captured image is too bright. Conversely, the exposure time length used to capture the subsequent image will be extended when the captured image is too dark. However, when this practice is adopted, the frame rate of the optical processing apparatus will be limited if the exposure time length becomes too long.

Another conventional optical processing apparatuses that has improved the aforesaid problem adjusts the gain value of the programmable gain amplifier (PGA). Specifically, the gain value used to capture the subsequent image will be reduced when the captured image is too bright. Conversely, the gain value used to capture the subsequent image will be increased when the captured image is too dark. However, too great a gain value will cause too many noises in the image, which undesirably makes the image quality poorer instead.

Accordingly, it is important to provide a technology capable of adjusting the settings of an optical processing apparatus according to the quality of the captured image. In case of poor image quality, the optical processing apparatus can still adjust the settings to make the quality of the subsequent captured images desirable. In this way, the optical processing apparatus or other apparatuses that are used with the optical processing apparatus can use an image that has a desirable quality for subsequent determinations and operations.

SUMMARY OF THE INVENTION

To improve the aforesaid problems, the present invention provides an optical processing apparatus, a light source luminance adjustment method, and a non-transitory computer readable medium thereof.

The present disclosure provides an optical processing apparatus adapted to detect a pressing state and a rotational displacement of a button. The optical processing apparatus includes a light source unit, a processing unit and an image sensing unit. The light source unit is configured to provide a beam of light to a surface of the button facing the light source unit. The processing unit is electrically connected to the light source unit, and configured to define a frame rate, define a plurality of first time instants within a first time interval, and set the beam of light provided by the light source unit to a luminance value at each of the first time instants, wherein a length of the first time interval is shorter than a reciprocal of the frame rate, and the luminance values are different and within a first range. The image sensing unit is electrically connected to the processing unit, and configured to capture a first image of the surface of the button by an exposure time length at each of the first time instants, wherein the exposure time lengths are the same. In this embodiment, the processing unit is further configured to calculate an image quality index of each of the first images, compare the image quality index of one of the first images with at least one first press threshold to identify the pressing state of the button within the first time interval, compare the image quality indices of each of the first images with at least one quality threshold, and select more than one of the first images as a plurality of first temporary images to calculate the rotational displacement of the button when the image quality indices do not meet the at least one quality threshold.

The present disclosure further provides a light source luminance adjustment method being adapted for use in an optical processing apparatus which is adapted to detect a pressing state and a rotational displacement of a button. The optical processing apparatus includes a light source unit, a processing unit, and an image sensing unit. The light source unit provides a beam of light to a surface of the button facing the light source unit. The processing unit defines a frame rate. The image sensing unit receives light reflected from the surface of the button. The light source luminance adjustment method includes the steps of: defining, by the processing unit, a plurality of first time instants within a first time interval, wherein a length of the first time interval is shorter than a reciprocal of the frame rate; setting, by the processing unit, the beam of light provided by the light source unit to a luminance value at each of the first time instants, wherein the luminance values are different and within a first range; capturing, by the image sensing unit, a first image of the surface of the button by an exposure time length at each of the first time instants, wherein the exposure time lengths are the same; calculating, by the processing unit, an image quality index of each of the first images; comparing, by the processing unit, the image quality index of one of the first images with at least one first press threshold to identify the pressing state of the button within the first time interval, comparing, by the processing unit, the image quality indices of each of the first images with at least one quality threshold; and selecting, by the processing unit, more than one of the first images as a plurality of first temporary images to calculate the rotational displacement of the button when the image quality indices do not meet the at least one quality threshold.

The present disclosure further provides an optical processing apparatus adapted to detect a pressing state and a rotational displacement of a button. The optical processing apparatus includes a light source unit, a processing unit and an image sensing unit. The light source unit is configured to provide a beam of light to a surface of the button facing the light source unit. The processing unit is electrically connected to the light source unit, and configured to define successive frame capturing periods, define a plurality of time instants within a time interval in each frame capturing period, wherein a length of the time interval is shorter than the frame capturing period, and set the beam of light provided by the light source unit to a luminance value at each of the plurality of time instants within each time interval. The image sensing unit is electrically connected to the processing unit, and configured to capture an image of the surface of the button by an exposure time length and a gain value at each of the plurality of time instants within the each time interval. In this embodiment, the processing unit is further configured to set an image capture parameter, which includes at least one of the luminance value, the exposure time length and the gain value, at each of the plurality of time instants to be different and within a predetermined range, calculate an image quality index of each of the images captured within the each time interval, compare the image quality index of a first image among the images captured within the each time interval with at least one press threshold to identify the pressing state of the button within the each time interval, wherein the first image corresponds to a minimum image capture parameter or a maximum image capture parameter among the plurality of time instants within the each time interval, and calculate the rotational displacement of the button using a second image among the images captured within the each time interval, wherein the second image is one of the images, among the plurality of time instants within the each time interval, whose image quality index meet at least one quality threshold.

As can be seen from the above descriptions, the present invention defines a plurality of time instants within a time interval (the length of this time interval is shorter than the reciprocal of the frame rate of the optical processing apparatus). At different time instants, the light source unit is set to different luminance values and the image sensing unit captures an image by the same exposure time length. In other words, the present invention captures multiple images by controlling the luminance of the light source unit. With this mechanism, the present invention can further provide a wide variety of operation modes. For example, the present invention may further determine the image qualities of these images and select at least one of the images which has an optimal or preferable image quality as an image representing this time interval. As another example, the present invention may also take the light source luminance value, which is used to capture the image with an optimal or preferable image quality, of the light source unit as a basic luminance value of the light source unit within the next time interval so that subsequent captured will have desirable qualities.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, the optical processing apparatus, the light source luminance adjustment method, and the non-transitory computer readable medium thereof according to the present invention will be explained with reference to embodiments thereof. However, these embodiments are not intended to limit the present invention to any specific environment, applications, or particular implementations described in these embodiments. Therefore, the description of these embodiments is only for the purpose of illustration rather than limitation. It should be appreciated that elements unrelated to the present invention are omitted from depiction in the following embodiments and the attached drawings.

Figure 1A:
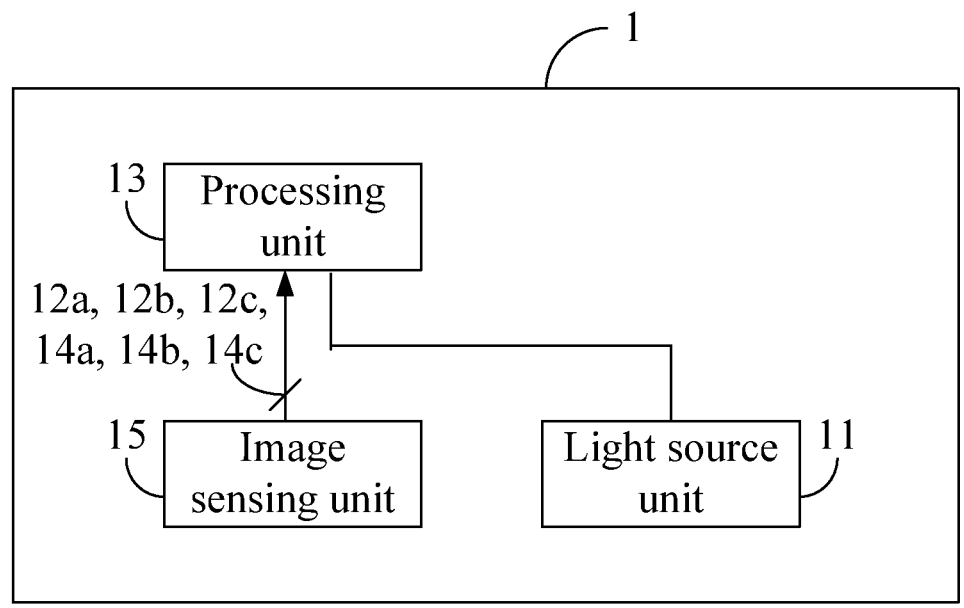
FIG. 1A is a schematic view depicting an optical processing apparatus 1 according to the first embodiment.

The first embodiment of the present invention is an optical processing apparatus 1, a schematic view of which is depicted in FIG. 1A. The optical processing apparatus 1 comprises a light source unit 11, a processing unit 13, and an image sensing unit 15. The processing unit 13 is electrically connected to the light source unit 11 and the image sensing unit 15.

The light source unit 11 may be a light emitting diode (LED) or some other light source units well-known to those of ordinary skill in the art. The processing unit 13 may be of any various processors, central processing units (CPUs), microprocessors, or other computing devices well-known to those of ordinary skill in the art. The image sensing unit 15 may be a complementary metal oxide semiconductor (CMOS) light sensing unit or an image sensing unit well-known to those of ordinary skill in the art.

When the optical processing apparatus 1 is powered on, the light source unit 11 generates a beam of light (not shown) of identifiable spectrum, while the processing unit 13 and the image sensing unit 15 perform operations provided by the present invention.

Figure 1B:
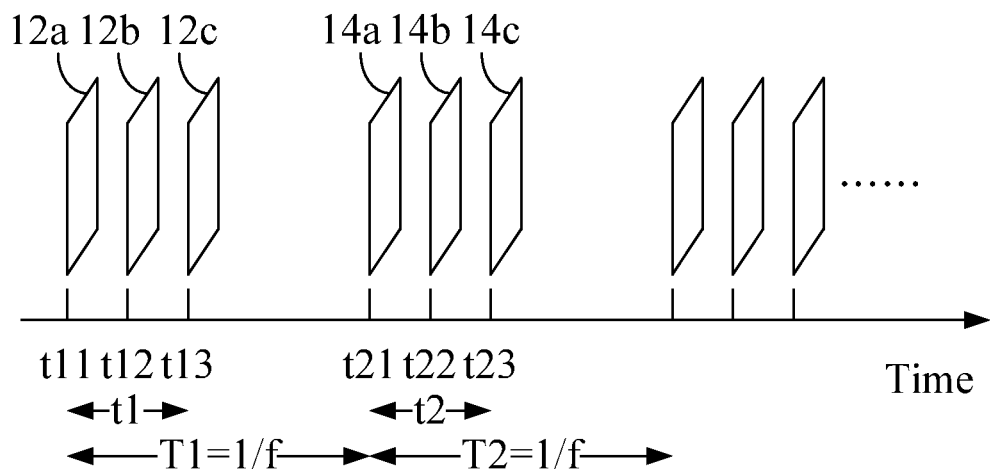
FIG. 1B is a schematic view depicting relationships between frame capturing periods, time intervals and images.

In this embodiment, the processing unit 13 defines a frame rate f. The frame rate f is the reciprocal of the frame capturing periods T1, T2 as shown in FIG. 1B. The time lengths of the frame capturing periods T1 and T2 are the same. It is noted that the frame capturing periods T1 and T2 being denoted as different reference symbols are only for indicating that they correspond to different frame capturing periods. The processing unit 13 defines a time interval t1 within the frame capturing period T1 and defines a plurality of time instants t11, t12, and t13 within the time interval t1. The time length of the time interval t1 is shorter than the time length of the frame capturing period T1. In other words, the time length of the time interval t1 is shorter than the reciprocal of the frame rate f.

The processing unit 13 sets the light beam provided by the light source unit 11 to a luminance value at each of the time instants t11, t12, and t13. It should be appreciated that the light beam of the light source unit 11 is set to different luminance values at each of the time instants t11, t12, and t13. The luminance values are within a first range. A specific example will now be described for illustration. It is assumed that the light source unit 11 has ten selectable different levels of luminance values and three levels (i.e., level 4 to level 6) of them are within the default range. When the optical processing apparatus 1 is powered on, the first range may be set to the default range. The light source luminance values set for the light source unit 11 at the time instants t11, t12, and t13 are respectively on level 4, level 5, and level 6 of the first range.

On the other hand, the image sensing unit 15 captures images 12a, 12b, and 12c respectively by the exposure time length at each of the time instants t11, t12, and t13. The exposure time lengths used to capture the images 12a, 12b, and 12c are the same. The above specific example is continued for illustration. The light source luminance value of the light source unit 11 is on level 4 at the time instant t11. The image sensing unit 15 captures the image 12a at this time instant.

Subsequently, the processing unit 13 calculates the image quality index of each of the images 12a, 12b, and 12c. The image quality index of each of the images 12a, 12b, and 12c may be a feature value (e.g., the number of pairs of bright and dark spots) and a luminance value (or referred to image intensity) of the corresponding image or other information value which can be used to determine the image quality. The processing unit 13 further derives a comparison result by comparing the image quality indices of the images 12a, 12b, and 12c with at least one threshold, i.e. at least one quality threshold.

For example, when the image quality index is a feature value of the image, a higher image quality index represents a better image quality. In such a case, the processing unit 13 may derive the comparison result by comparing the image quality indices of the images 12a, 12b, and 12c with a threshold. The comparison result may indicate which images have image quality indices higher than the threshold and the sequence of those images.

As another example, when the image quality index is the luminance value or image intensity (e.g., an averaged luminance value or averaged image intensity), image quality indices falling within a luminance value range (i.e., values between an upper threshold and lower threshold) represent good image qualities, whereas image quality indices that are too high (higher than the upper threshold) or too low (lower than the lower threshold) represent bad image qualities. In such a case, the processing unit 13 may derive the comparison result by comparing the image quality indices of the images 12a, 12b, and 12c with the two thresholds (i.e. the upper and lower thresholds). This comparison result may indicate which images have image quality indices between the two thresholds.

No matter what kind of information the image is used as the image quality index, the aforesaid comparison results can be classified into two categories. One category is that at least a part of the image quality indices meet the requirements (i.e., at least a part of the images 12a, 12b, and 12c meeting the at least one quality threshold to have good image qualities), while the other category is that none of the image quality indices meets the requirements (i.e., the images 12a, 12b, and 12c all failing to meet the at least one quality threshold to have bad image qualities). In the following description, the method in which the processing unit 13 subsequently determines the first selected image representing the time interval t1 and determines the second range of light source luminance values used by the light source unit 11 within the time interval t2 of the next frame capturing period T2 will be described with respect to each of the two classes respectively.

Now, the first class (i.e., the case in which at least a part of the image quality indices meet the requirement) will be described firstly. The processing unit 13 selects one of the images 12a, 12b, and 12c as a first selected image (e.g., the image 12c) representing the time interval t1 according to the comparison result. The first selected image can be considered as the image representing the frame capturing period T1. In particular, the processing unit 13 selects the image represented by one of the image quality indices that meet the requirement as the first selected image according to the comparison result. In the case that the image quality index is the feature value, the processing unit 13 selects the image represented by any one of the image quality indices that are higher than the threshold as the first selected image. In the case that the image quality index is the luminance value of the image, the processing unit 13 selects the image represented by any one of the image quality indices ranging between the upper threshold and the lower threshold as the first selected image. In one embodiment, the selected first image representing the frame capturing period T1 is used to calculate displacement of the optical processing apparatus 1 with respect to a reflective surface.

If the optical processing apparatus 1 continuous operating, the processing unit 13 defines a time interval t2 within the frame capturing period T2 immediately after the frame capturing period T1. The time interval t2 occurs later than the time interval t1. Furthermore, the time length of the aforesaid time interval t2 is shorter than the time length of the frame capturing period T2. In other words, the time length of the time interval t2 is shorter than the reciprocal of the frame rate f.

The processing unit 13 sets a basic luminance value of the time interval t2 to the luminance value corresponding to the first selected image and determines a second range according to this basic luminance value. For example, the second range may comprise the basic luminance value as well as luminance values of one (or more) previous level and one (or more) subsequent level. Assuming that the first selected image is the image 12c and the image 12c is captured under conditions that the light source luminance value of the light source unit 11 is on level 6, then the basic luminance value of the time interval t2 is on level 6 while the second range ranges are between level 5 to level 7.

Subsequently, the second class (i.e., the case in which none of the image quality indices meets the requirement) will be described. Since the comparison result indicates that none of the image quality indices meets the requirement, the processing unit 13 selects more than one of the images 12a, 12b and 12c as a plurality of first temporary images according to this comparison result. Then, the processing unit 13 derives an averaged image by averaging the first temporary images and sets the averaged image as the first selected image representing the time interval t1. The first selected image can also be considered as the image representing the frame capturing period T1. Similarly, the selected first image representing the frame capturing period T1 is used to calculate displacement of the optical processing apparatus 1 with respect to a reflective surface.

Similarly, if the optical processing apparatus 1 continuous operating, the processing unit 13 defines the time interval t2 within the frame capturing period T2 immediately after the frame capturing period T1. The time interval t2 occurs later than the time interval t1. Furthermore, the time length of the aforesaid time interval t2 is shorter than the time length of the frame capturing period T2. In other words, the time length of the aforesaid time interval t2 is shorter than the reciprocal of the frame rate f.

In such a case, the processing unit 13 determines the second range of the light source luminance value to be set for the light source unit 11 within the time interval t2. Since none of the image quality indices of the images 12a, 12b and 12c meets the requirement, the processing unit 13 adjusts the second range on the basis of the first range. For example, if the image quality index is the luminance value of the image and all of the image quality indices are lower than the lower threshold (i.e., the images 12a, 12b and 12c are too dark), the processing unit 13 may adjust each luminance value level within the first range to be higher by a predetermined number of levels and use the adjusted luminance value levels as the second range (e.g., when the first range is between level 4 to level 6, the second range may be set from level 6 to level 8), or may add one more level to the luminance value levels contained in the first range (e.g., when the first range is between level 4 to level 6, the second range may be set from level 4 to level 7). In the case that the image quality index is the luminance value of the image and all of the image quality indices are higher than the upper threshold, a reverse process can be performed. In the case that the image quality index is the feature value of the image and all of the image quality indices are lower than the lower threshold, the processing unit 13 may also adjust each luminance value level within the first range to be higher with a predetermined number of levels. In addition, the adjusted luminance value levels may be used as the second range, or may add one more level to the luminance levels contained in the first range.

After the processing unit 13 has determined the second range of the light source luminance value to be used by the light source unit 11 within the time interval t2 of the next frame capturing period T2, a subsequent operation will be described next.

The processing unit 13 defines a plurality of time instants t21, t22 and t23 within the time interval t2. It should be appreciated that the number of time instants defined within the time interval t2 is the same as the number of the light source luminance value levels within the second range. Subsequently, the processing unit 13 sets the light beam provided by the light source unit 11 to a luminance value at each of the time instants t21, t22 and t23. It should be appreciated that the light source luminance values set for the light source unit 11 at each of the time instants t21, t22 and t23 are different and are within the second range. On the other hand, the image sensing unit 15 captures images 14a, 14b and 14c respectively by the same exposure time length at each of the time instants t21, t22 and t23.

Similarly, the processing unit 13 then calculates the image quality index of each of the images 14a, 14b and 14c. The image quality index of each of the images 14a, 14b and 14c may be the feature value, luminance value (or referred to image intensity) of the corresponding image or other informational value that can be used to determine the image quality. The processing unit 13 further derives a comparison result by comparing the image quality indices of the images 14a, 14b and 14c with at least one threshold. Afterwards, the processing unit 13 further selects a second selected image representing the time interval t2 according to the comparison result. For example, the processing unit 13 selects one of the images 14a, 14b and 14c as a second selected image (e.g., the image 14b) representing the time interval t2, or sets an averaged image of the images 14a, 14b and 14c as the second selected image. The second selected image can also be considered as the image representing the frame capturing period T2. In one embodiment, the selected second image representing the frame capturing period T2 is used to calculate displacement of the optical processing apparatus 1 with respect to a reflective surface, e.g., by comparing the selected first image representing the frame capturing period T1 and the selected second image representing the frame capturing period T2. If the optical processing apparatus 1 continuous operating, operations similar to what has been described above can be repeated.

It should be appreciated that in this embodiment, the lengths of the time intervals defined by the processing unit 13 within different frame capturing periods are not necessarily the same as long as the lengths of the time intervals are shorter than the frame capturing periods (i.e., the reciprocal of the frame rate). Furthermore, the numbers of time instants defined by the processing unit 13 within different time intervals are not necessarily the same. In other words, the numbers of images captured by the image sensing unit 15 within different time intervals are not necessarily the same. For example, when images captured within the time intervals of a certain frame capturing period all have good qualities, it can be expected that images to be captured by the image sensing unit 15 within the next frame capturing period will also have good image qualities. Then the processing unit 13 may define fewer time instants within the time intervals of the next frame capturing period to decrease the number of images to be captured by the image sensing unit 15. With such a configuration, the resources consumed by the optical processing apparatus 1 can be duly reduced.

As can be seen from the above descriptions, the optical processing apparatus 1 defines a time interval within each frame capturing period, captures multiple images with different light source luminance values within this time interval, and further calculates the image quality index of each image. When at least a part of the images have good qualities, the optical processing apparatus 1 selects an image with good image quality as the image representing this time interval, e.g., for calculating displacement. The light source luminance value, which is used to capture the image with good image quality, is then set as the basic luminance value to be used by the light source unit within the next frame capturing period. When all of the images have bad qualities, the optical processing apparatus selects the averaged image of these images as the image representing this time interval, e.g., for calculating displacement, and duly adjusts the range of the light source luminance values to be used within the next frame capturing period. Since the range of the luminance values to be used by the light source unit within the next frame capturing period is adjusted based on the image qualities, it can be expected that images to be captured by the image sensing unit 15 within the next frame capturing period will have preferable image qualities.

Furthermore, since the optical processing apparatus 1 adjusts the light source luminance value of the light source unit instead of adjusting the exposure time length used to capture images or adjusting the gain value of a programmable gain amplifier, the optical processing apparatus 1 does not have the shortcomings of the prior art.

Figure 2A:
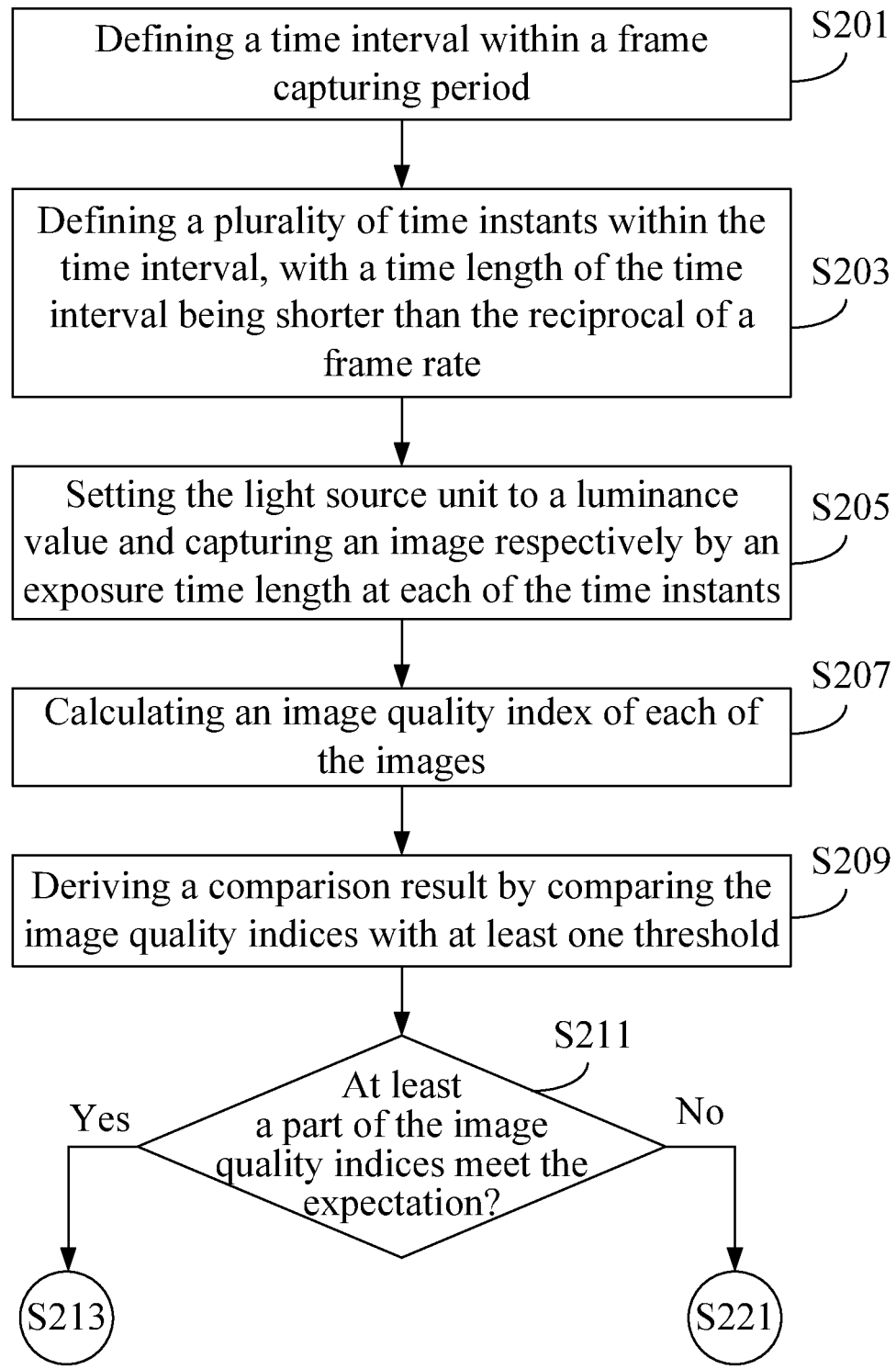
FIGS. 2A, 2B and 2C are flowchart diagrams depicting the second embodiment.
Figure 2B:
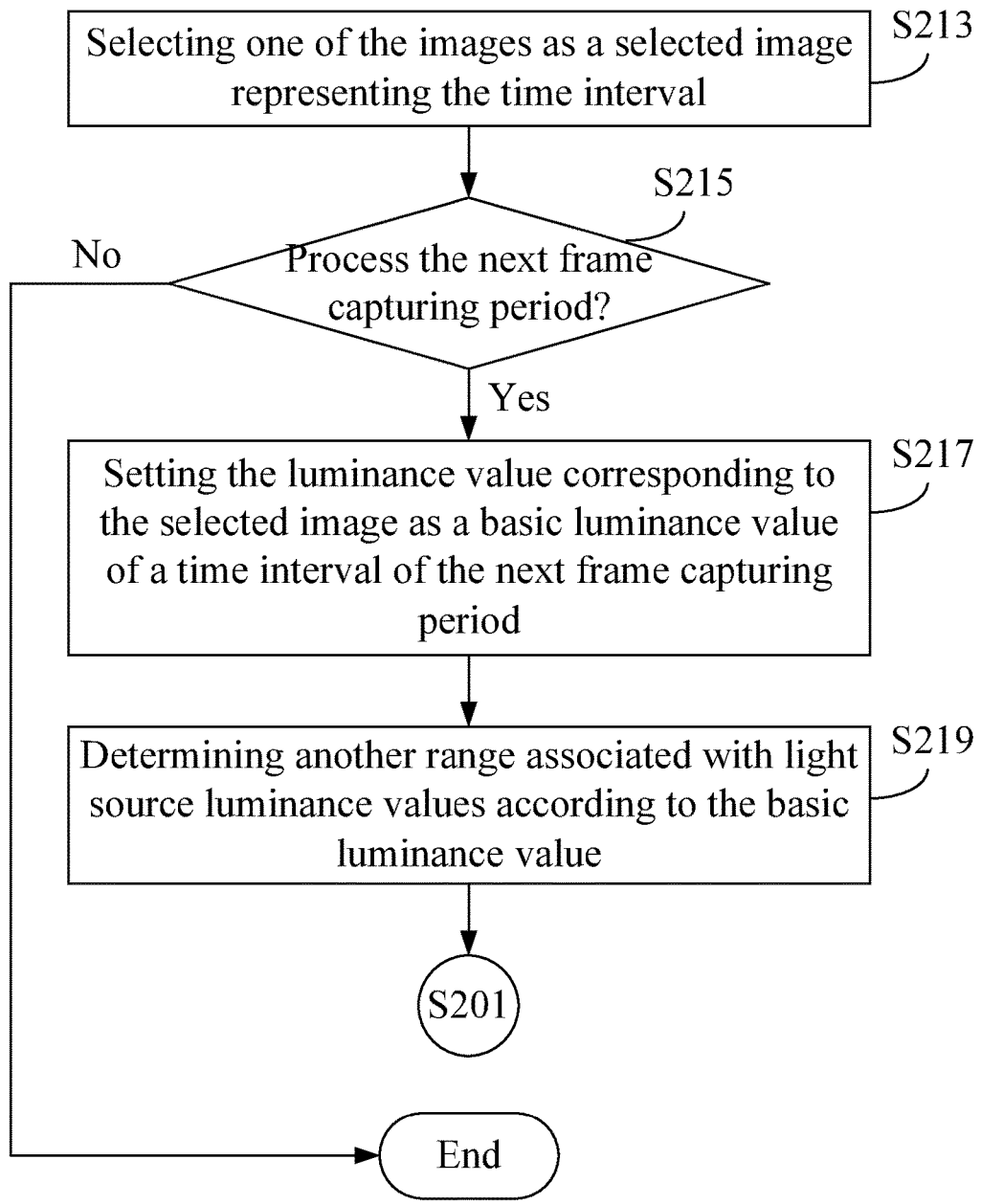
Figure 2C:
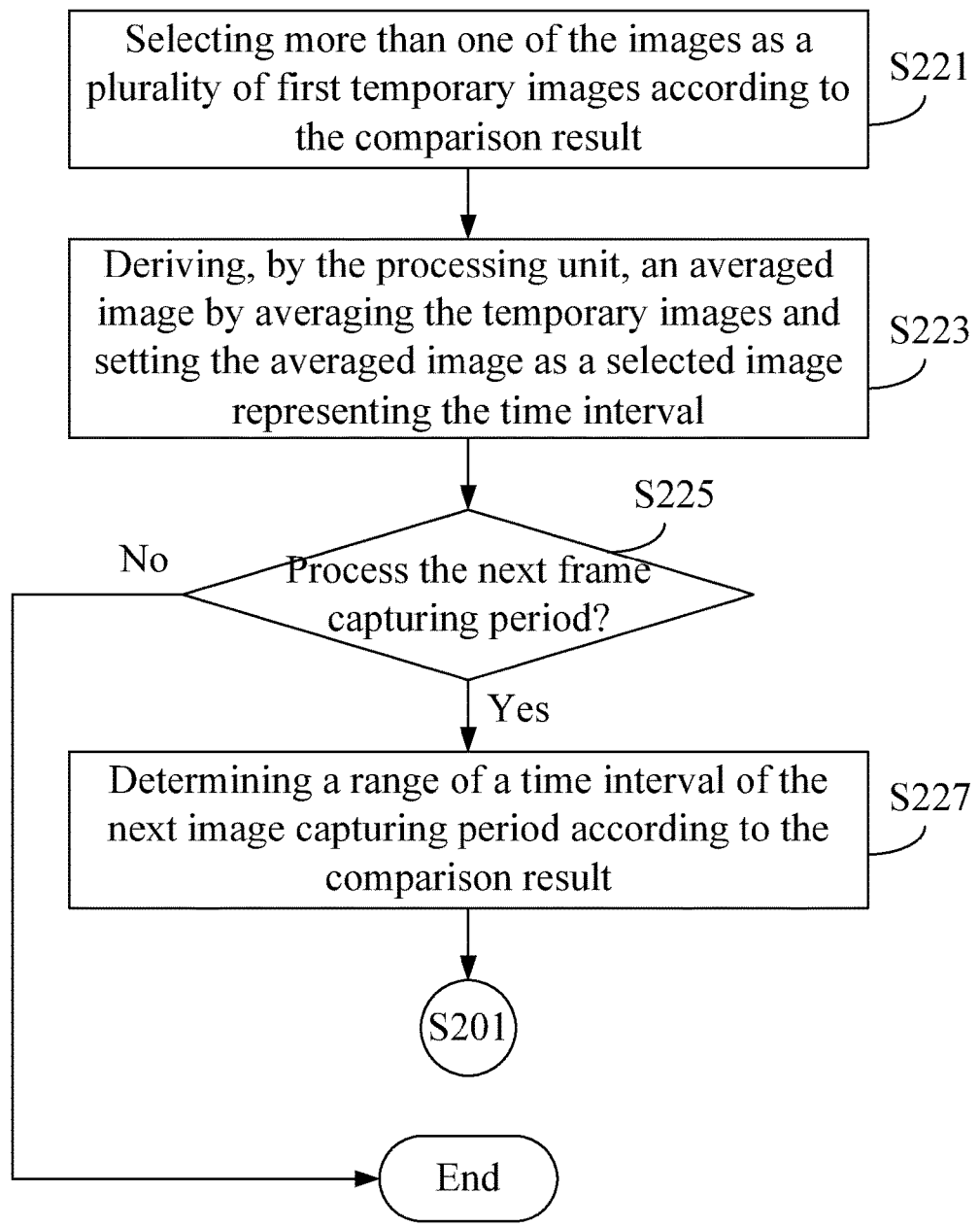

The second embodiment of the present invention is a light source luminance adjustment method, a flowchart diagram of which is depicted in FIGS. 2A, 2B and 2C. The light source luminance adjustment method is adapted for use in an optical processing apparatus (e.g., the optical processing apparatus 1 of the first embodiment). The optical processing apparatus comprises a light source unit, an image sensing unit, and a processing unit. The light source unit provides a beam of light, while the processing unit defines a frame rate.

The light source luminance adjustment method first executes step S201 to define, by the processing unit, a time interval within a frame capturing period. Subsequently, step S203 is executed to define, by the processing unit, a plurality of time instants within the time interval, with the time length of the time interval being shorter than the reciprocal of the frame rate.

Then, step S205 is executed to set, by the processing unit, the light source unit to a luminance value and to capture, by the image sensing unit, an image by an exposure time length at each of the time instants. It should be appreciated that the luminance values set at different time instants are different and are within a range. Furthermore, the exposure time lengths used to capture images at different time instants are the same. Subsequently, step S207 is executed to calculate, by the processing unit, an image quality index of each of the images. Then, step S209 is executed to derive, by the processing unit, a comparison result by comparing the image quality indices with at least one threshold.

Subsequently, step S211 is executed to determine whether at least a part of the image quality indices meet the requirement (i.e., whether at least a part of the images captured in step S205 have good image qualities) according to the comparison result. If the answer is "yes", step S213 is executed to select, by the processing unit, one of the images as a selected image representing the time interval according to the comparison result. More particularly, in step S213, the image corresponding to the image quality index that meets the requirement is selected as the selected image.

Then, step S215 is executed to determine, by the processing unit, whether to process the next frame capturing period. If the answer is "yes", step S217 is executed to set, by the processing unit, a basic luminance value of a time interval of the next frame capturing period to the luminance value corresponding to the selected image. Subsequently, step S219 is executed to determine, by the processing unit, another range of light source luminance values according to the basic luminance value. Then, step S201 is executed again. If the determination result of step S215 is no, the light source luminance adjustment method is finished.

If the determination result of step S211 is no (i.e., none of the image quality indices meets the requirement, or in other words, images captured in step S205 all have bad image qualities), step S221 is executed.

In step S221, the processing unit selects more than one of the images as a plurality of first temporary images according to the comparison result. More particularly, the processing unit may select all of the images as the temporary images. Subsequently, in step S223, the processing unit derives an averaged image by averaging the temporary images and sets the averaged image as the selected image representing the time interval.

Then, step S225 is executed to determine, by the processing unit, whether to process the next frame capturing period. If the answer is "yes", step S277 is executed to determine, by the processing unit, the range of a time interval of the next frame capturing period according to the comparison result. It should be appreciated that the range determined in step S227 is associated with the light source luminance value to be used by the light source unit within the time interval of the next frame capturing period. Furthermore, the range determined in step S227 is different from that in step S205. Then, step S201 is executed again. On the other hand, if the determination result of step S225 is no, the light source luminance adjustment method is finished.

In addition to the aforesaid steps, the second embodiment can also execute all the operations and functions set forth in the first embodiment. The method in which the second embodiment executes these operations and functions will be readily appreciated by those of ordinary skill in the art based on the explanation of the first embodiment, and thus, will not be further described herein.

Moreover, the light source luminance adjustment method described in the second embodiment may be implemented by a non-transitory computer readable medium. The non-transitory computer readable medium has a computer program stored therein. The computer program executes the light source luminance adjustment method described in the second embodiment after being loaded into an optical processing apparatus. The computer program may be a file that can be transmitted through a network, or may be stored in a tangible machine-readable medium, such as a read only memory (ROM), a flash memory, a floppy disk, a hard disk, a compact disk, a mobile disk, a magnetic tape, a database accessible to networks, or any other storage media with the same function and well known to those skilled in the art.

Figure 3:
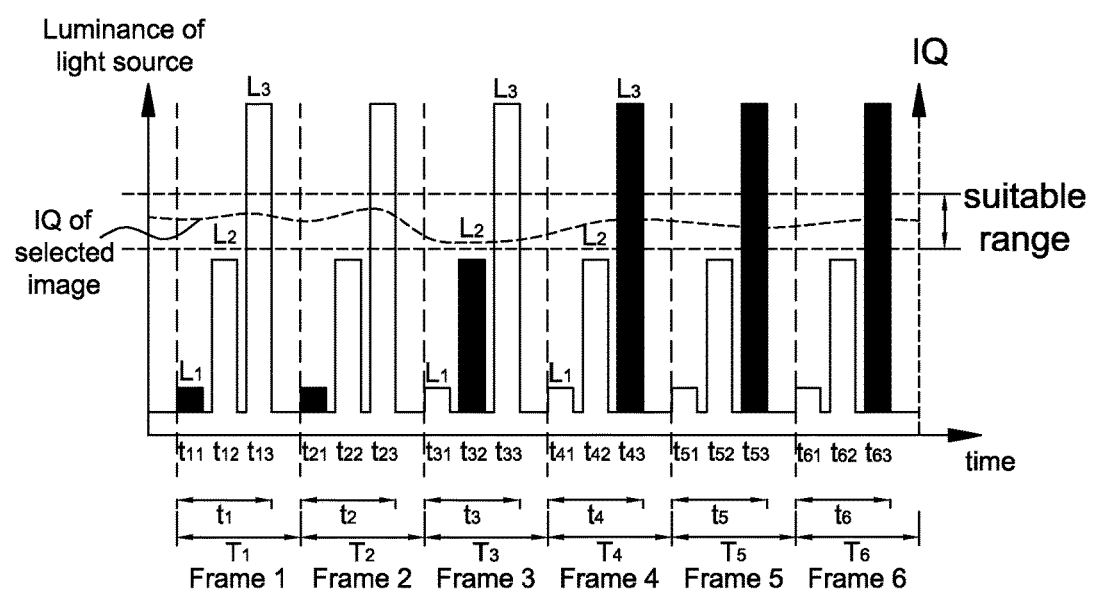
FIG. 3 is an operational schematic diagram of an optical processing apparatus in the first and second embodiments of the present disclosure.

According to the above descriptions and FIG. 3, FIG. 3 is an operational schematic diagram of an optical processing apparatus 1 in the first and second embodiments of the present disclosure. For example, FIG. 3 shows that the optical processing apparatus 1 is operated on a high reflective surface during Frames 1 and 2, and moves to a lower reflective surface during Frame 3, and is operated on a super low reflective surface during Frames 4 to 6. The present invention defines a time interval (e.g., $t_1 \sim t_6$) within each frame capturing period (e.g., $T_1 \sim T_6$), captures multiple images (e.g., $12a \sim 12c$, $14a \sim 14c$ in FIG. 1B) with different light source luminance values (e.g., levels $L_1 \sim L_3$) within this time interval, and further calculates the image quality index of each of the multiple images. When at least a part of the multiple images have good qualities, one of the images with a good image quality (e.g., the first image in Frames 1 and 2; the second image in Frame 3; the third image in Frames 4 to 6) is selected as the image representing this time interval, e.g., for calculating displacement. The light source luminance value used to capture the image with good image quality is set as the basic luminance value to be used by the light source unit within the next frame capturing period. When all of the images have bad image qualities, an averaged image of the images is set as the image representing this time interval, e.g., for calculating displacement, and a range of light source luminance values to be used within the next frame capturing period is duly adjusted. Since the range of luminance values to be used by the light source unit within the next frame capturing period is adjusted based on the image qualities of a current frame capturing period, it can be expected that images to be captured within the next frame capturing period will have preferable image qualities. Moreover, since the first and second embodiments adjust the light source luminance of the light source unit instead of adjusting the exposure time length used to capture images or adjusting the gain value of the programmable gain amplifier, they do not have the shortcomings of the prior art.

It should be mentioned that if all of the images captured in said next frame capturing period also have bad image qualities (e.g., out of a suitable range as shown in FIG. 3), the range of luminance values is continuously adjusted based on the image qualities of the images captured in said next frame capturing period till at least one of the images have good quality. Preferably, the image quality of at least one of the images captured in one frame capturing period is adjusted to be within the suitable range. The suitable range is determined according to the resolution and noise tolerance of the optical processing apparatus.

As mentioned above, said image representing one time interval may be used to calculate a displacement of the optical processing apparatus with respect to a reflective surface.

In one embodiment, the optical processing apparatus of the present disclosure is adapted to detect a pressing state and a rotational displacement of a button, such as a watch crown.

Figure 4:
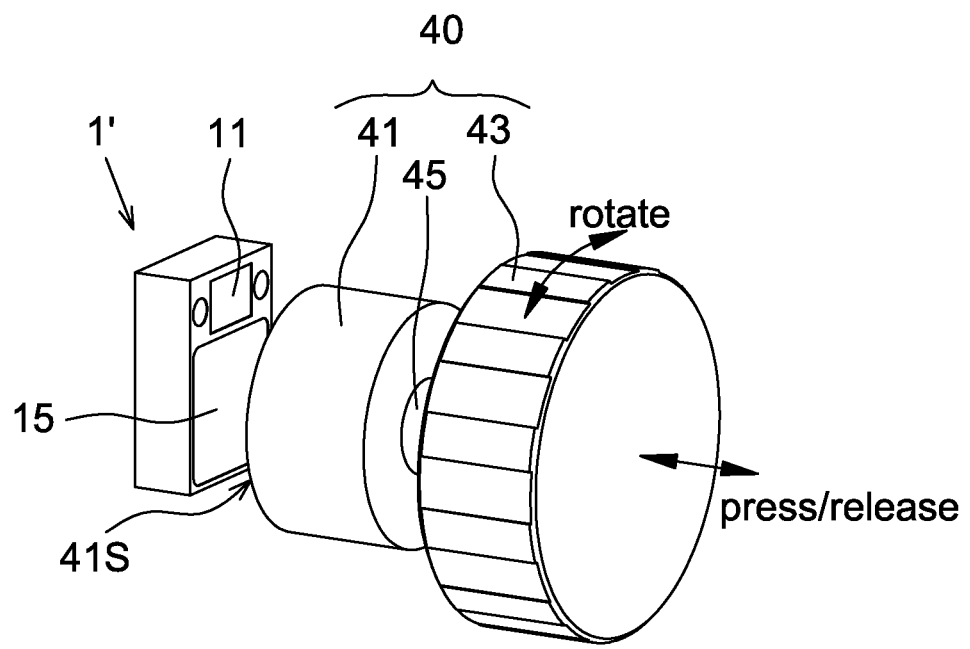
FIG. 4 is an application embodiment of an optical processing apparatus according to a third embodiment of the present disclosure.

Referring to FIG. 4, it is an application embodiment of an optical processing apparatus 1' according to a third embodiment of the present disclosure in which the optical processing apparatus 1' is adapted to detect a pressing state and a rotational displacement of a watch crown 40. In FIG. 4, the watch crown 40 is shown to include a rotary shaft 41, a rotary part 43, and a connection part 45 for connecting the rotary shaft 41 and the rotary part 43. The function and structure of a watch crown is known to the art and thus details thereof are not described therein. It should be mentioned that although FIG. 4 takes a watch crown 40 as an example for illustrating a button, the present disclosure is not limited thereto. The button may be other types having a proper structure as long as it can be pushed/pulled and rotated by a user, and has a surface to be illuminated and captured by the optical processing apparatus 1'.

Figure 5:
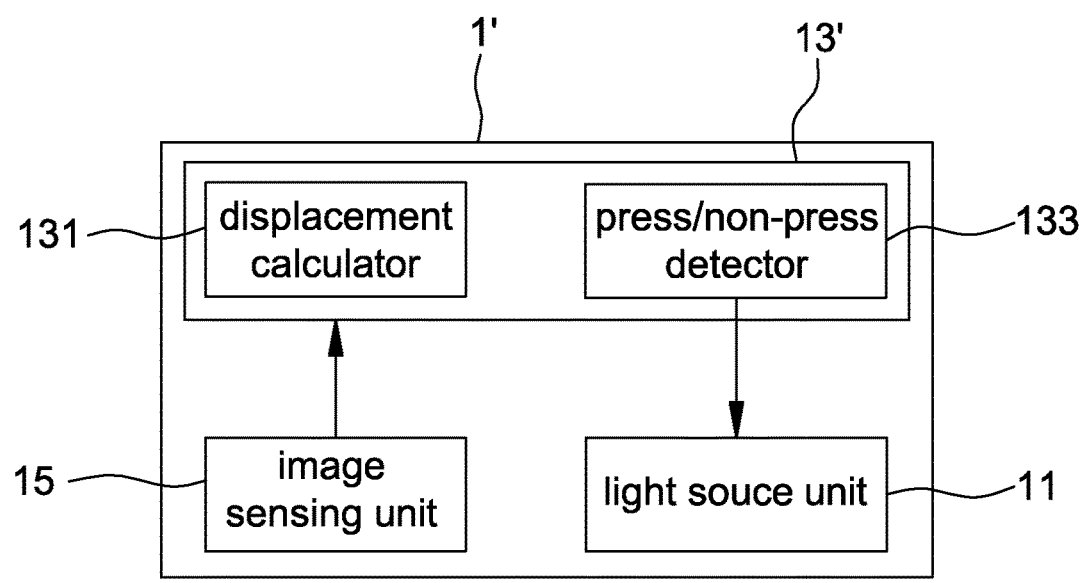
FIG. 5 is a block diagram of an optical processing apparatus according to the third embodiment of the present disclosure.

Referring to FIG. 5 together, FIG. 5 is a block diagram of an optical processing apparatus 1' according to the third embodiment of the present disclosure. The optical processing apparatus 1' includes a processing unit 13', the light source unit 11 and the image sensing unit 15. In this embodiment, the processing unit 13' further includes a displacement calculator 131 and the press/non-press detector 133. Similar to the above first and second embodiments, the processing unit 13' is a CPU, MCU or ASIC and preferably includes at least one memory device, e.g., a volatile memory and/or a nonvolatile memory, such that operations of the displacement calculator 131 and the press/non-press detector 133 are implemented by hardware codes and/or software codes operating in conjunction with the memory device. It should be mentioned that although FIG. 5 shows the displacement calculator 131 and the press/non-press detector 133 with different functional blocks, it is only intended to illustrate but not to limit the present disclosure. Operations of both the displacement calculator 131 and the press/non-press detector 133 are considered to be performed by the processing unit 13'.

In the third embodiment of the present disclosure, the displacement calculator 131, the light source unit 11 and the image sensing unit 15 performs similar operations as the optical processing apparatus 1 of the first and second embodiments, i.e., the displacement calculator 131 performing the operations of the processing unit 13 of the first and second embodiments. Operations of the light source unit 11 and the image sensing unit 15 controlled by the displacement calculator 131 in the third embodiment are similar to those in the first and second embodiments, and thus details thereof are not repeated herein.

Figure 6:
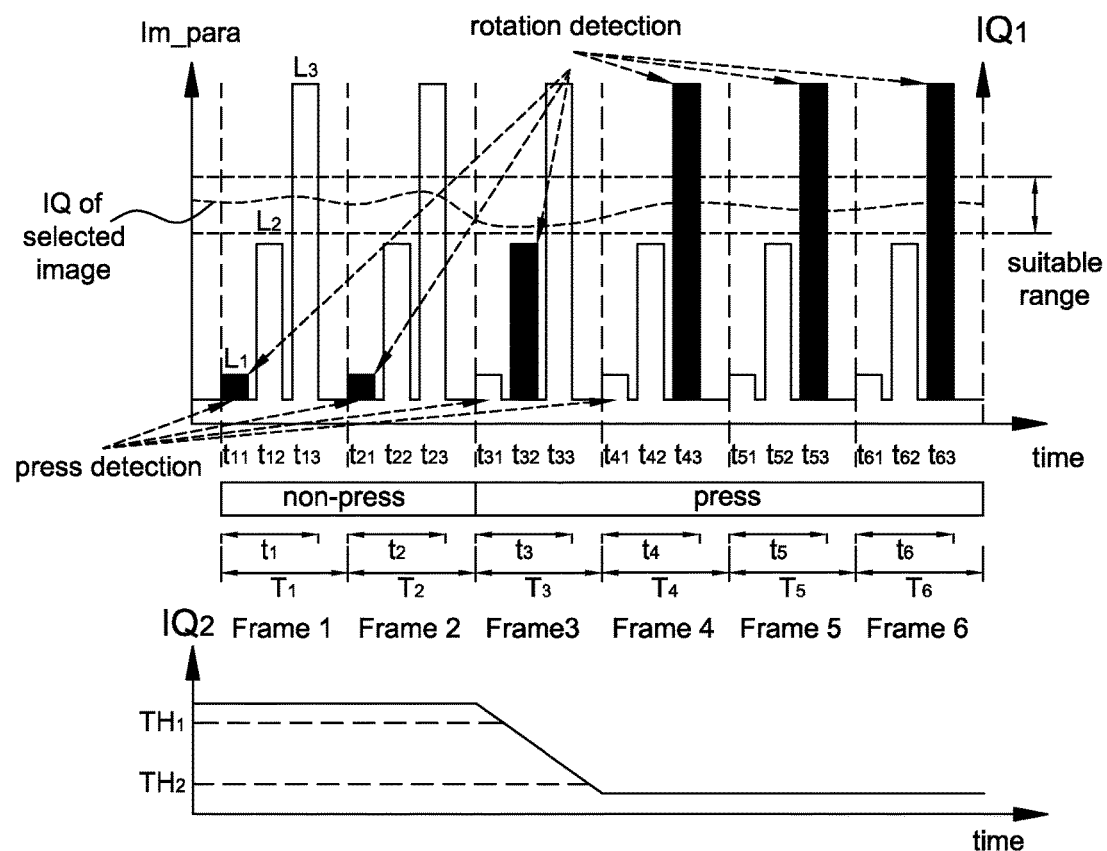
FIG. 6 is an operational schematic diagram of an optical processing apparatus according to the third embodiment of the present disclosure.

Referring to FIG. 6, it is an operational schematic diagram of an optical processing apparatus 1' according to the third embodiment of the present disclosure. Referring to FIGS. 4-6 together, the light source unit 11 is also used to provide a beam of light to a reflective surface, wherein the reflective surface in this embodiment is a surface (e.g., a bottom surface 41S of the rotary shaft 41) of the button (e.g., a watch crown 40 in FIG. 4) facing the light source unit 11. It is appreciated that it is possible to arrange the light source unit 11 to opposite to another surface of the rotary shaft 41 instead of the bottom surface 41S.

Similarly, the displacement calculator 131 (or the processing unit 13') is electrically connected to the light source unit 11, and configured to define a frame rate (e.g., 1/T1 ), define a plurality of first time instants (e.g., t11, t12, t13) within a first time interval (e.g., t1), and set the beam of light provided by the light source unit 11 to a luminance value (e.g., levels L1~L3) at each of the first time instants (e.g., t11, t12, t13), wherein a length of the first time interval (e.g., t1) is shorter than a reciprocal of the frame rate (e.g., T1), and the luminance values (e.g., levels L1~L3) are different and within a first range. The arrangement of the luminance values herein may take the example in the first embodiment mentioned above.

Similarly, the image sensing unit 15 is electrically connected to the displacement calculator 131 (or processing unit 13'), and configured to receive light reflected from the surface 41S of the button for capturing a first image (e.g., 12a, 12b, 12c in FIG. 1B) of the surface 41S of the button by an exposure time length at each of the first time instants (e.g., t11, t12, t13), wherein the exposure time lengths are the same in one embodiment.

The displacement calculator 131 (or processing unit 13') is also further configured to calculate an image quality index of each of the first images (e.g., 12a, 12b, 12c in FIG. 1B), compare the image quality indices of each of the first images with at least one quality threshold, and select more than one of the first images as a plurality of first temporary images to calculate the rotational displacement of the button (e.g., along an rotate direction in FIG. 4) when the image quality indices do not meet the at least one quality threshold. The displacement calculator 131 (or processing unit 13') also selects an image with a good image quality to represent the first time interval (e.g., t1) for calculating the rotational displacement when at least a part of the images have good qualities (e.g., IQ1 within a suitable range).

The operations of the light source unit 11, the displacement calculator 131 and the image sensing unit 15 in the third embodiment have been described in the above first and second embodiments (e.g., FIGS. 2A to 2C), and thus details thereof are not repeated herein.

In addition to the above operations, the optical processing apparatus 1' further has other operations performed by the press/non-press detector 133 described below. More specifically, the optical processing apparatus 1' performs all the operations of the optical processing apparatus 1 of the first and second embodiments as well as additional operations.

The press/non-press detector 133 of the processing unit 13' compares the image quality index (IQ2) of one of the first images (e.g., captured at t11, t12, t13 in FIG. 6) with at least one first press threshold (e.g., two first press thresholds TH1 and TH2 being shown in FIG. 6) to identify a pressing state of the button within the first time interval t1 (or first image capturing period T1), wherein as mentioned above the image quality index may be one of a feature value and image intensity of the images captured within the first time interval t1. In this embodiment, the one of the first images corresponds to a minimum luminance value (e.g., captured at t11 in FIG. 6) or a maximum luminance value (captured at t13 in FIG. 6) of the light source unit 11 among the first time instants (e.g., t11, t12, t13 in FIG. 6) as long as the selected one of the first images is close to saturation when the button is pressed or not pressed to obtain a maximum button linear distance.

Figures 7A, 7B:
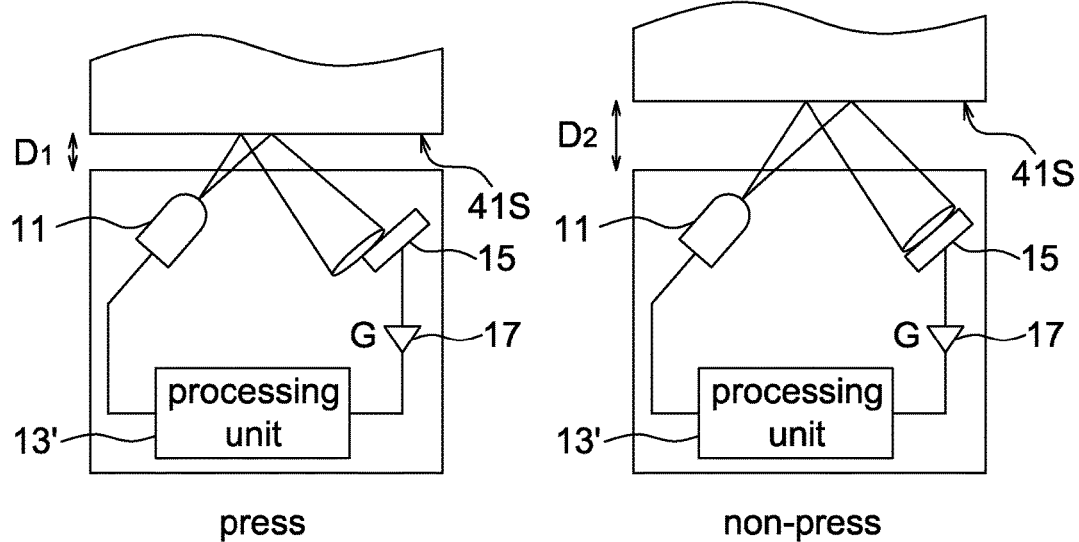
FIGS. 7A and 7B are schematic diagrams of the press/non-press states of a button.

The pressing state identified by the press/non-press detector 133 is classified into a press state and a non-press state. For example, referring to FIGS. 7A and 7B together, the light source unit 11 provides a beam of light to a surface 41S of the button, and the image sensing unit 15 receives light reflected from the surface 41S and outputs an image corresponding to each of the time instants (e.g., t11, t12, t13 in FIG. 6) within the first time interval t1. Corresponding to different distances(e.g., D1 and D2) between the button and the optical processing apparatus 1', the press/non-press detector 133 is able to identify the press state and the non-press state according to the image quality index (e.g., IQ2 in FIG. 6). In the case that the image quality index is image intensity of the images captured at each of the time instants (e.g., t11, t12, t13 in FIG. 6) within the first time interval t1, the press/non-press detector 133 identifies lower image intensity when the button is pressed (part of lights not impinging on the image sensing unit 15 as shown in FIG. 7A) and higher image intensity when the button is not pressed (most of lights impinging on the image sensing unit 15 as shown in FIG. 7B). For example, when the press/non-press detector 133 identifies that the image intensity is lower than a press threshold TH2, a press state is confirmed; on the contrary, when the press/non-press detector 133 identifies that the image intensity is higher than a press threshold TH1, which is higher than the press threshold TH2, a non-press is confirmed.

In the third embodiment, as the optical processing apparatus 1' is able to calculate a rotational displacement and a pressing state of a watch crown 40, the processing unit 1' is arranged to stop outputting the rotational displacement when the image quality index (IQ2) of the selected first image is between the press threshold TH1 and TH2 as shown in FIG. 6. In some cases, when the image quality index (IQ2) of the first image is between the press threshold TH1 and TH2, it means that the watch crown 40 is on the way being pulled or pushed between two states and thus the rotation during this transitional period may be taken as undesired movement and ignored.

Figures 8A, 8B:
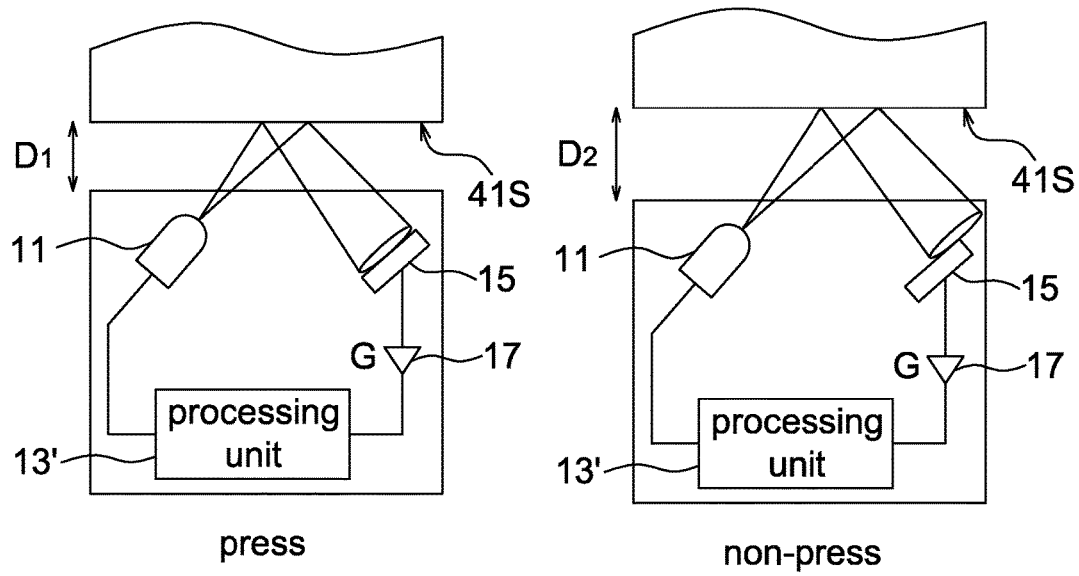
FIGS. 8A and 8B are other schematic diagrams of the press/non-press states of a button.

It is appreciated that the image quality index of the images captured at each of the time instants is determined according to the arrangement of the light source unit 11 and the image sensing unit 15. Accordingly, it is possible that the press/non-press detector 133 identifies lower image intensity when the button is not pressed (as shown in FIG. 8B) but higher image intensity when the button is pressed (as shown in FIG. 8A).

Similarly, if the optical processing apparatus 1' continuous operating, the processing unit 13' decides a second range corresponding to a second time interval (e.g., t2 in FIG. 6) according to a comparison result of comparing the image quality indices with the at least one quality threshold in the first time interval (e.g., t1 in FIG. 6), defines a plurality of second time instants (e.g., t21, t22, t23 in FIG. 6) within the second time interval t2, and sets the beam of light provided by the light source unit 11 to a luminance value at each of the second time instants (e.g., t21, t22, t23), wherein the luminance values corresponding to the second time interval t2 are different and within the second range. The image sensing unit 15 captures a second image (e.g., 14a, 14b, 14c in FIG. 1B) by the exposure time length at each of the second time instants (e.g., t21, t22, t23). Details of the above operations have been described in the first and second embodiments and thus are not repeated herein.

In addition to the above operations, the press/non-press detector 133 (or the processing unit 13') calculates an image quality index of each of the second images (e.g., captured at t21, t22, t23 in FIG. 6), and compares the image quality index of one of the second images with at least one second press threshold to identify a pressing state of the button within the second time interval t2, wherein the one of the second images corresponds to a minimum luminance value (e.g., t21) or a maximum luminance value (e.g., t23) of the light source unit 11 among the second time instants (e.g., captured at t21, t22, t23). If the second range is different from the first range, the at least one first press threshold is different from the at least one second press threshold, wherein the first and second press thresholds are previously arranged and stored before shipment in a memory device of the optical processing apparatus 1'.

Figure 9:
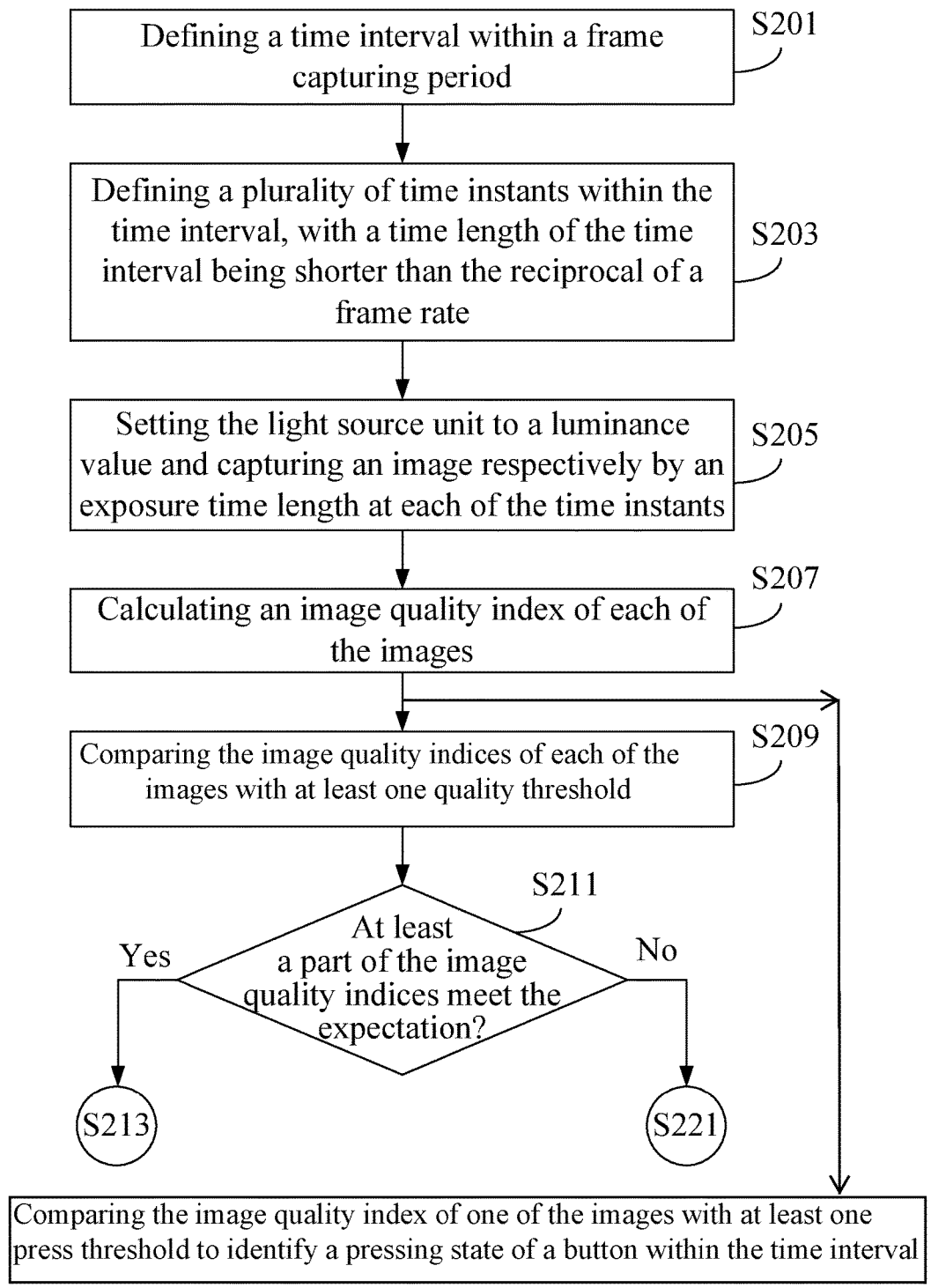
FIG. 9 is a flowchart diagrams depicting the third embodiment of the present disclosure.

In the flow chart of the light source luminance adjustment method shown in FIG. 2A, the step of comparing the image quality index of one of the first images with at least one first press threshold to identify a pressing state of the button within the first time interval may be inserted after the image quality indices are calculated as shown in FIG. 9. It should be mentioned that the pressing state is identified before, concurrently or after the steps S209, S211, S221 and S213 according to different applications. Similarly, if the optical processing apparatus 1' continuous operating, the optical processing apparatus 1' moves to a next frame capturing period (e.g., T2) and performs the steps of: calculating an image quality index of each of the second images (e.g., captured at t21, t22, t23 in FIG. 6); and comparing the image quality index of one of the second images with at least one second press threshold to identify the pressing state of the button within the second time interval (e.g., t2). More specifically, the press/non-press detector 133 identifies a pressing state within every frame capturing period (e.g., T1~T6).

In the above embodiments, the image quality index of the images captured at each time instances is determined only according to the luminance value of the light source unit 11.

In other embodiments, it is also possible to control the image quality index of the images captured at each time instances according to an exposure time length and a gain value.

Referring to FIG. 6 again, in this embodiment, the processing unit 13' defines successive frame capturing periods (e.g., T1~T6), defines a plurality of time instants (e.g., t11~t13, t21~t23 . . . t61~t63) within a time interval (e.g., t1, t2 . . . t6) in each frame capturing period, wherein a length of the time interval is shorter than the frame capturing period, and sets the beam of light provided by the light source unit 11 to a luminance value (e.g., levels L1~L3) at each of the plurality of time instants within each time interval. The image sensing unit 15 captures an image of the surface 41S of the button by an exposure time length and a gain value G of a programmable gain amplifier 17 at each of the plurality of time instants within the each time interval. It should be mentioned that although FIGS. 7A-7B and 8A-8B show that the programmable gain amplifier 17 is separated from the image sensing unit 15, it is only intended to illustrate. In some embodiments, it is possible that the programmable gain amplifier 17 is integrated in the image sensing unit 15.

In this embodiment, the displacement calculator 131 (or the processing unit 13') sets an image capture parameter (Im_para), which includes at least one of the luminance value, the exposure time length and the gain value, at each of the plurality of time instants to be different and within a predetermined range. The displacement calculator 131 then calculates an image quality index of each of the images captured (e.g., at t11~t13, t21~t23 . . . t61~t63) within the each time interval (e.g., t1~t6), and calculates the rotational displacement of the button using a second image among the images captured within the each time interval, wherein the second image is one of the images, among the plurality of time instants within the each time interval, whose image quality index meet at least one quality threshold. In other words, the displacement calculator 131 performs operations similar to those performed by the processing unit 13 in the first and second embodiments above only the luminance value of the light source unit 11 is replaced by the image capture parameter (Im_para). More specifically, it is possible to modify the image quality index by changing the luminance value of the light source unit 11, the exposure time length of the image sensing unit 15 and/or the gain value of the programmable gain amplifier 17 in this embodiment. As mentioned above, when all of the images have bad image qualities, an averaged image of the second images is set as the image representing one time interval for calculating the rotational displacement.

The press/non-press detector 133 compares the image quality index of a first image among the images captured within the each time interval with at least one press threshold to identify a pressing state of the button within the each time interval, wherein the first image corresponds to a minimum image capture parameter (e.g., minimum luminance value, exposure time length or gain value) or a maximum image capture parameter (e.g., maximum luminance value, exposure time length or gain value) among the plurality of time instants within the each time interval. The press/non-press detector 133 may identify the pressing state in each Frame or every a predetermined number of Frames.

More specifically, in this embodiment, the first image is associated with a same time instant among the plurality of time instants within every frame capturing period, e.g., fixed as the first one image or the last one image captured within every frame capturing period. That is, the position of the first image among the plurality of images within each time interval is not adaptively changed during operation.

However, the second image is selected according to its image quality index (e.g., meeting the at least one quality threshold or not), and thus the second image is possibly associated with different time instants among the plurality of time instants within the each time interval of two adjacent frame capturing periods. For example referring to FIG. 6 again, the second image is selected as the first one in time intervals t1 and t2, as the second one in the time interval t3, and as the third one in time intervals t4 to t6.

As mentioned above, the processing unit 13' further sets the image capture parameter within a different predetermined range when the image quality indices of the images captured within one of the successive frame capturing periods do not meet the at least one quality threshold in order to adjust the image quality of at least one of the images captured within a next frame capturing period to be within a suitable range. The press threshold and quality threshold may also be changed when the image capture parameter is changed.

It is appreciated that a normal state of the button may be a press state or a non-press state according to different applications. In the present disclosure, types and values of the press threshold may or may not be identical to those of the quality threshold. In the present disclosure, a type of the image quality index to be compared with the press threshold (e.g., IQ2 in FIG. 6) may or may not be identical to that compared with the quality threshold (e.g., IQ1 in FIG. 6). In the present disclosure, the first and second ranges of the luminance value of the light source unit 11 associated with different Frames may or may not be identical.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An optical processing apparatus, adapted to detect a pressing state and a rotational displacement of a button, the optical processing apparatus comprising:
   a light source unit configured to provide a beam of light to a surface of the button facing the light source unit to generate a reflected light beam reflected from the surface of the button;
   a processing unit, electrically connected to the light source unit, and configured to
   define a frame rate,
   define a plurality of first time instants within a first time interval, and
   set the beam of light provided by the light source unit to a luminance value at each of the first time instants, wherein a length of the first time interval is shorter than a reciprocal of the frame rate, and the luminance values are different and within a first range; and
   an image sensing unit, electrically connected to the processing unit, and configured to capture the reflected light beam to output a first image of the surface of the button by an exposure time length at each of the first time instants, wherein the exposure time lengths are the same, wherein the processing unit is further configured to
calculate an image quality index of each of the first images,
compare the image quality index of one of the first images with at least one first press threshold to identify the pressing state of the button within the first time interval,
compare the image quality indices of each of the first images with at least one quality threshold, and
select more than one of the first images as a plurality of first temporary images to calculate the rotational displacement of the button when the image quality indices do not meet the at least one quality threshold,
wherein the light source unit and the image sensing unit are arranged to change the image quality index in an arrangement that, when the pressing state of the button is changed between press and non-press, a part of a cross-section of the reflected light beam is shifted between impinging and not impinging on the image sensing unit due to a uniform distance change between the surface of the button and the light source unit and between the surface of the button and the image sensing unit, and
when the processing unit identifies that the pressing state of the button is between the press and the non-press by comparing the image quality index with the at least one first press threshold, the rotational displacement calculated between the press and the non-press is taken as undesired movement and not outputted by the processing unit.

2. The optical processing apparatus of claim 1, wherein the processing unit is further configured to derive an averaged image by averaging the first temporary images and set the averaged image as a first selected image representing the first time interval.

3. The optical processing apparatus of claim 1, wherein the processing unit is further configured to
decide a second range corresponding to a second time interval according to a comparison result of comparing the image quality indices with the at least one quality threshold, wherein the second time interval occurs later than the first time interval, a length of the second time interval is shorter than the reciprocal of the frame rate, and the second range is different from the first range,
define a plurality of second time instants within the second time interval, and
set the beam of light provided by the light source unit to a luminance value at each of the second time instants, wherein the luminance values corresponding to the second time interval are different and within the second range, and
wherein the image sensing unit is further configured to capture the reflected light beam to output a second image by the exposure time length at each of the second time instants.

4. The optical processing apparatus of claim 3, wherein the processing unit is further configured to
calculate an image quality index of each of the second images, and
compare the image quality index of one of the second images with at least one second press threshold to identify the pressing state of the button within the second time interval, wherein the one of the second images corresponds to a minimum luminance value or a maximum luminance value of the light source unit among the second time instants.

5. The optical processing apparatus of claim 1, wherein each image quality index is one of a feature value and image intensity of the corresponding first image.

6. The optical processing apparatus of claim 1, wherein the button is a watch crown.

7. The optical processing apparatus of claim 1, wherein the one of the first images corresponds to a minimum luminance value or a maximum luminance value of the light source unit among the first time instants.

8. The optical processing apparatus of claim 1, wherein the uniform distance change between the surface of the button and the light source unit changes a propagation distance of the beam of light from the light source unit to the surface of the button to cause the part of the cross-section of the reflected light beam to be shifted.

9. A light source luminance adjustment method, being adapted for use in an optical processing apparatus which is adapted to detect a pressing state and a rotational displacement of a button, the optical processing apparatus comprising a light source unit, a processing unit, and an image sensing unit, the light source unit providing a beam of light to a surface of the button facing the light source unit to generate a reflected light beam reflected from the surface of the button, the processing unit defining a frame rate, the image sensing unit receiving the reflected light beam reflected from the surface of the button, wherein the light source unit and the image sensing unit are arranged to change an image quality index in an arrangement that, when the pressing state of the button is changed between press and non-press, a part of a cross-section of the reflected light beam is shifted between impinging and not impinging on the image sensing unit due to a uniform distance change between the surface of the button and the light source unit and between the surface of the button and the image sensing unit, and the light source luminance adjustment method comprising:
defining, by the processing unit, a plurality of first time instants within a first time interval, wherein a length of the first time interval is shorter than a reciprocal of the frame rate;
setting, by the processing unit, the beam of light provided by the light source unit to a luminance value at each of the first time instants, wherein the luminance values are different and within a first range;
capturing, by the image sensing unit, the reflected light beam to output a first image of the surface of the button by an exposure time length at each of the first time instants, wherein the exposure time lengths are the same;
calculating, by the processing unit, the image quality index of each of the first images;
comparing, by the processing unit, the image quality index of one of the first images with at least one first press threshold to identify the pressing state of the button within the first time interval,
comparing, by the processing unit, the image quality indices of each of the first images with at least one quality threshold; and
selecting, by the processing unit, more than one of the first images as a plurality of first temporary images to calculate the rotational displacement of the button when the image quality indices do not meet the at least one quality threshold;
stop outputting the calculated rotational displacement when the pressing state of the button is identified between the press and the non-press by comparing the image quality index with the at least one first press threshold.

10. The light source luminance adjustment method of claim 9, further comprising:
deriving, by the processing unit, an averaged image by averaging the first temporary images; and
setting, by the processing unit, the averaged image as a first selected image representing the first time interval.

11. The light source luminance adjustment method of claim 9, further comprising:
deciding, by the processing unit, a second range corresponding to a second time interval according to a comparison result of comparing the image quality indices with the at least one quality threshold, wherein the second time interval occurs later than the first time interval, a length of the second time interval is shorter than the reciprocal of the frame rate, and the second range is different from the first range;
defining, by the processing unit, a plurality of second time instants within the second time interval;
setting, by the processing unit, the beam of light provided by the light source unit to a luminance value at each of the second time instants, wherein the luminance values corresponding to the second time interval are different and within the second range; and
capturing, by the image sensing unit, the reflected light beam to output a second image by the exposure time length at each of the second time instants.

12. The light source luminance adjustment method of claim 11, further comprising:
calculating an image quality index of each of the second images, and
comparing the image quality index of one of the second images with at least one second press threshold to identify the pressing state of the button within the second time interval, wherein the one of the second images corresponds to a minimum luminance value or a maximum luminance value of the light source unit among the second time instants.

13. The light source luminance adjustment method of claim 9, wherein each image quality index is one of a feature value and image intensity of the corresponding first image.

14. The light source luminance adjustment method of claim 9, wherein the one of the first images corresponds to a minimum luminance value or a maximum luminance value of the light source unit among the first time instants.

15. An optical processing apparatus, adapted to detect a pressing state and a rotational displacement of a button, the optical processing apparatus comprising:
a light source unit configured to provide a beam of light to a surface of the button facing the light source unit to generate a reflected light beam reflected from the surface of the button;
a processing unit, electrically connected to the light source unit, and configured to
define successive frame capturing periods,
define a plurality of time instants within a time interval in each frame capturing period, wherein a length of the time interval is shorter than the frame capturing period, and
set the beam of light provided by the light source unit to a luminance value at each of the plurality of time instants within each time interval; and an image sensing unit, electrically connected to the processing unit, and configured to capture the reflected light beam to output an image of the surface of the button by an exposure time length and a gain value at each of the plurality of time instants within the each time interval,
wherein the processing unit is further configured to
set an image capture parameter, which includes at least one of the luminance value, the exposure time length and the gain value, at each of the plurality of time instants to be different and within a predetermined range,
calculate an image quality index of each of the images captured within the each time interval,
compare the image quality index of a first image among the images captured within the each time interval with at least one press threshold to identify the pressing state of the button within the each time interval, wherein the first image corresponds to a minimum image capture parameter or a maximum image capture parameter among the plurality of time instants within the each time interval, and
calculate the rotational displacement of the button using a second image among the images captured within the each time interval, wherein the second image is one of the images, among the plurality of time instants within the each time interval, whose image quality index meet at least one quality threshold,
wherein the light source unit and the image sensing unit are arranged to change the image quality index in an arrangement that, when the pressing state of the button is changed between press and non-press, a part of a cross-section of the reflected light beam is shifted between impinging and not impinging on the image sensing unit due to a uniform distance change between the surface of the button and the light source unit and between the surface of the button and the image sensing unit, and
the processing unit is further configured to stop outputting the calculated rotational displacement when the pressing state of the button is identified between the press and the non-press by comparing the image quality index with the at least one press threshold.

16. The optical processing apparatus of claim 15, wherein the button is a watch crown.

17. The optical processing apparatus of claim 15, wherein each image quality index is one of a feature value and image intensity of the corresponding image.

18. The optical processing apparatus of claim 15, wherein the first image is associated with a same time instant among the plurality of time instants within every frame capturing period.

19. The optical processing apparatus of claim 15, wherein the second image is associated with different time instants among the plurality of time instants within the each time interval of two adjacent frame capturing periods.

20. The optical processing apparatus of claim 15, wherein the processing unit is further configured to set the image capture parameter within a different predetermined range when the image quality indices of the images captured within one of the successive frame capturing periods do not meet the at least one quality threshold.

* * * * *